United States Patent
Murdock et al.

(10) Patent No.: US 6,515,579 B1
(45) Date of Patent: Feb. 4, 2003

(54) SWITCHING APPARATUS FOR ROUTING COMMUNICATION CHANNELS THROUGH A SATELLITE PAYLOAD

(75) Inventors: Gerald T. Murdock, Sunnyvale, CA (US); Weimin Zhang, Mountain View, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/163,663

(22) Filed: Sep. 30, 1998

(51) Int. Cl.[7] ............................................... H03F 1/00
(52) U.S. Cl. .................... 340/14.1; 340/14.69; 370/480
(58) Field of Search ........................... 340/14.12, 14.69, 340/2.28; 333/104, 101, 106; 342/175, 188; 343/756; 370/480, 408, 535; 327/408, 416; 385/17, 24

(56) References Cited

U.S. PATENT DOCUMENTS

| | | | | |
|---|---|---|---|---|
| 3,833,866 A | * | 9/1974 | Boutelant | .................... 333/104 |
| 5,136,300 A | * | 8/1992 | Clarke et al. | ................ 342/175 |
| 5,504,745 A | * | 4/1996 | Petz et al. | .................... 333/104 |
| 5,568,158 A | * | 10/1996 | Gould | .......................... 343/756 |

* cited by examiner

Primary Examiner—Michael Horabik
Assistant Examiner—William Bangachon
(74) Attorney, Agent, or Firm—Kenneth W. Float

(57) ABSTRACT

Active switch matrix apparatus that is used in a satellite communications system that provides for reconfigurability of the communication channels of the communications system. The active switch matrix apparatus has redundan channels and components that provides for a high probability of success during the lifetime of the satellite. The active switch matrix apparatus is comprised of two switch matrices, one for each polarization (horizontal and vertical). Each of the switch matrices contains redundancy, including redundant paths through power dividers, power combiners and amplifiers to outputs of the apparatus. This is accomplished using a plurality of controllable switches 16 in the power dividers and a plurality of controllable output switches coupled to outputs of the amplifiers. Each of the switch matrices are coupled to redundant DC/DC converters and switch matrix controllers.

19 Claims, 3 Drawing Sheets

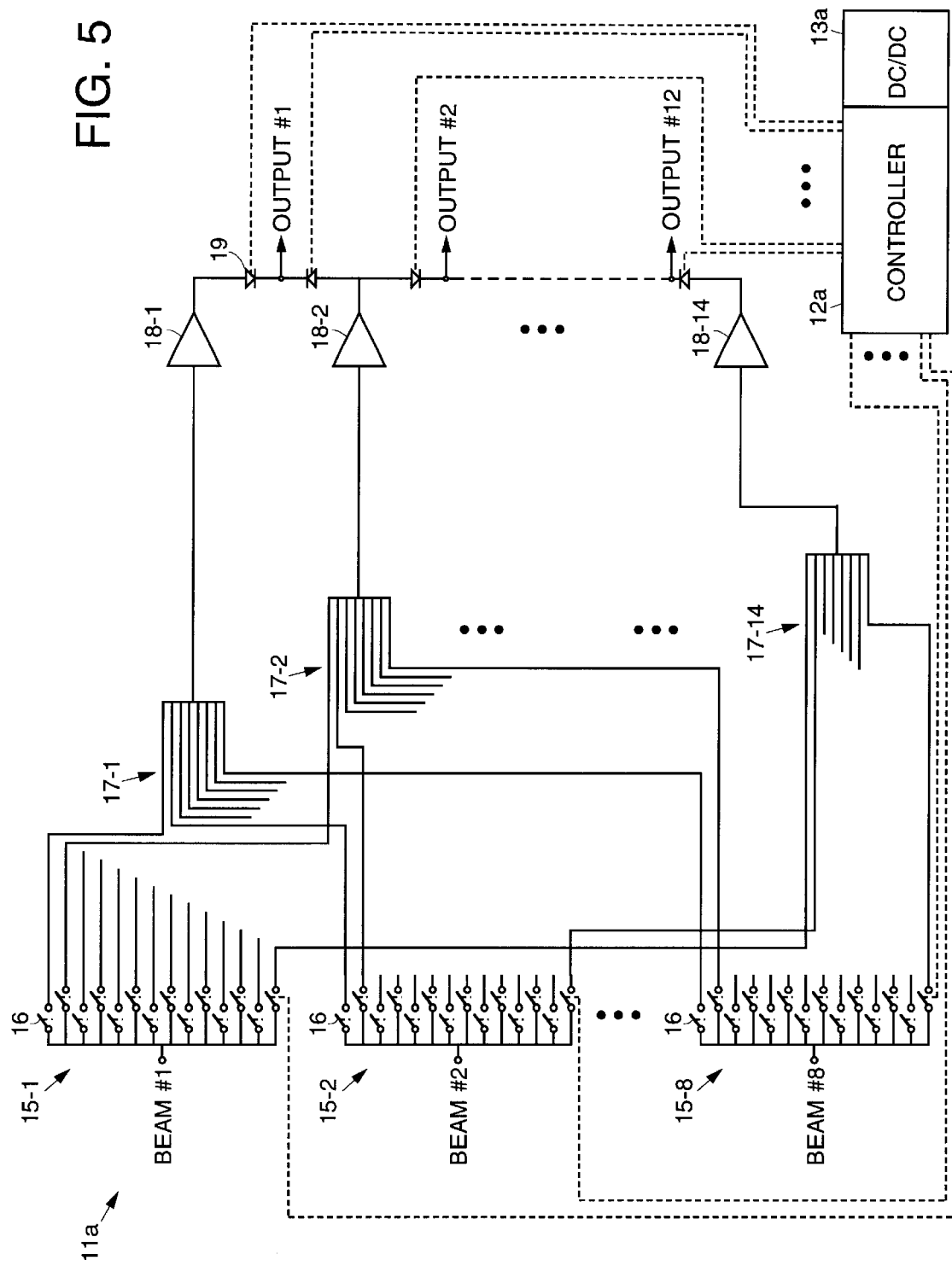

SWITCHING APPARATUS FOR ROUTING COMMUNICATION CHANNELS THROUGH A SATELLITE PAYLOAD

BACKGROUND

The present invention relates generally to satellite switching systems, and more particularly, to an active switch matrix subsystem for routing communication channels through a satellite payload.

The assignee of the present invention manufactures communication satellites that operate to receive and retransmit telephone and data communication signals between users. Customers that utilize assigned communication channels on such satellites have expressed a desire to have a very fast payload switch matrix for reconfiguring their payload on the order of millions of cycles per mission.

It would therefore be desirable to have a switching system for use in satellites that permits rapid reconfiguration of the satellite payload. Accordingly, it is an objective of the present invention to provide for an active switch matrix subsystem for routing communication channels through a satellite payload.

SUMMARY OF THE INVENTION

To accomplish the above and other objectives, the present invention provides for switching apparatus comprising active switch matrix apparatus or subsystem that may be used in a satellite communications system or payload that provides the ability to reconfigure communication channels of the satellite payload in only a few milliseconds. The switching apparatus has redundancy that provides for a high probability of success during the lifetime of the satellite. One aspect of the switching apparatus is that it provides increased flexibility and speed at which the payload may be reconfigured.

In general, the switching apparatus comprises first and second switch matrices. The switch matrices each comprise a plurality of power dividers that each comprise a plurality of controllable switches, a plurality of power combiners coupled to corresponding outputs of each of the plurality of power dividers, a plurality of amplifiers respectively coupled to outputs of the plurality of power combiners, and a plurality of controllable output switches coupled to outputs of the plurality of amplifiers that are selectively enabled to provide outputs of the switching apparatus. A switch matrix controller is coupled to the controllable switches and controllable output switches for selectively switching the switches to provide communication paths through the apparatus. A DC/DC converter provides DC power to the switch matrix controller and switch matrices.

To provide for additional redundancy, a backup switch matrix controller is coupled to the controllable switches and controllable output switches for selectively switching the switches to provide communication paths through the apparatus. A second DC/DC converter provides DC power to the second switch matrix controller and switch matrix assembly when it is in operation.

More specifically, the active switch matrix apparatus is comprised of two switch matrices, one for each polarization (horizontal and vertical). Each of the switch matrices has redundancy, including redundant paths through power dividers, power combiners and amplifiers to outputs of the apparatus. Each of the switch matrices are coupled to redundant DC/DC converters and switch matrix controllers. The first and second switch matrices respectively process a plurality of beams having first and second polarization states. Each switch matrix comprises a plurality of power dividers that respectfully process the plurality of beams and divides power derived from each of the beams.

Each switch matrix comprises a plurality of power dividers that are each coupled to a plurality of controllable switches, and a plurality of power combiners whose respective inputs are coupled to receive corresponding outputs of the plurality of controllable switches of each of the plurality of power dividers. A plurality of amplifiers are respectively coupled to outputs of the plurality of power combiners, and a plurality of controllable output switches coupled to outputs of the plurality of amplifiers that are selectively enabled to provide outputs of the active switch matrix apparatus.

First and second redundant switch matrix controllers are coupled to the plurality of controllable switches and to the plurality of pairs of controllable output switches for selectively switching the switches to route the beams through the apparatus. First and second redundant DC/DC converters are coupled to the first switch matrix controller that provide DC power to an active switch matrix controller and to the switch matrix assemblies.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5 is a more detailed diagram illustrating the exemplary active switch matrix of FIG. 1.

DETAILED DESCRIPTION

Figure 1:
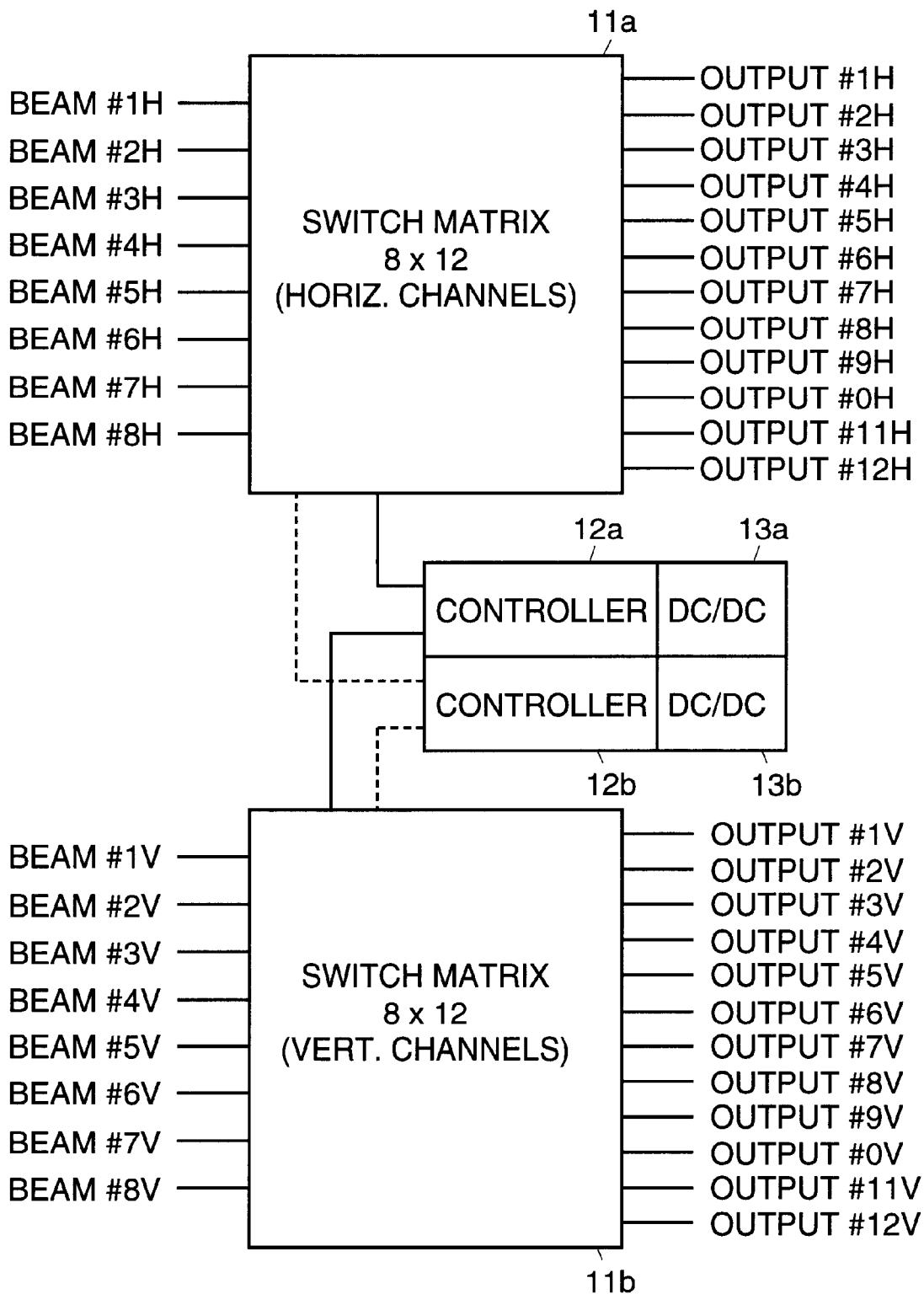
FIG. 1 illustrates a simplified top level diagram of an exemplary active switch matrix subsystem in accordance with the principles of the present invention.

Referring to the drawing figures, FIG. 1 illustrates a simplified top level diagram of exemplary switching apparatus 10 in accordance with the principles of the present invention comprising an active switch matrix subsystem 10. The exemplary active switch matrix subsystem 10 is comprised of two 8×12 switch matrix assemblies 11a, 11b, one for each polarization (horizontal and vertical), and a first DC/DC converter 13a and first switch matrix controller 12a. The two 8×12 switch matrix assemblies 11a, 11b and the first DC/DC converter 13a and first switch matrix controller 12a incorporate redundancy. This redundancy is provided by a second DC/DC converter 13b and second switch matrix controller 12b shown in FIG. 1. The DC/DC converters 13a, 13b are used to provide DC power to an active switch matrix controller 12a, 12b and to the switch matrix assemblies 11a, 11b.

The exemplary subsystem 10 shown in FIG. 1 may be used as a Ka-band switch matrix subsystem 10, for example. While the exemplary switch matrix subsystem 10 incorporates two 8×12 switch matrices 11a, 11b, the active switch matrix subsystem 10 is not limited to only 8×12 switch matrices 11a, 11b, but may employ different configurations of matrices 11a, 11b to produce alternative subsystems 10 that may be used for different applications.

Figure 2:
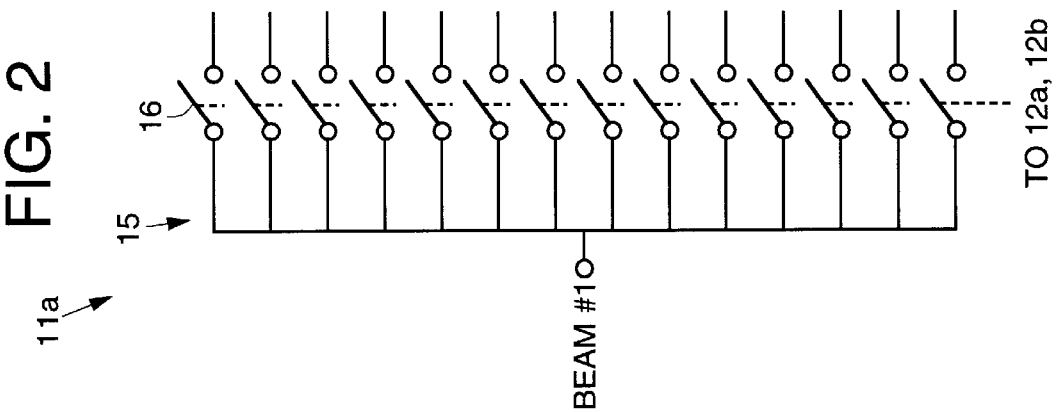
FIG. 2 shows a power divider incorporating PIN diode switches that may be used in the active switch matrix subsystem.

FIG. 2 illustrates an exemplary power divider 15 incorporating PIN diode switches 16. A plurality of the power dividers 15 are used in each of the switch matrices 11a, 11b of the active switch matrix subsystem 10. Each of the PIN diode switches 16 are switched under control of the first switch matrix controller 12a. Alternatively, each of the PIN diode switches 16 may be switched under control of the second switch matrix controller 12b due to the redundancy provided by the second switch matrix controller 12b.

Figure 3:
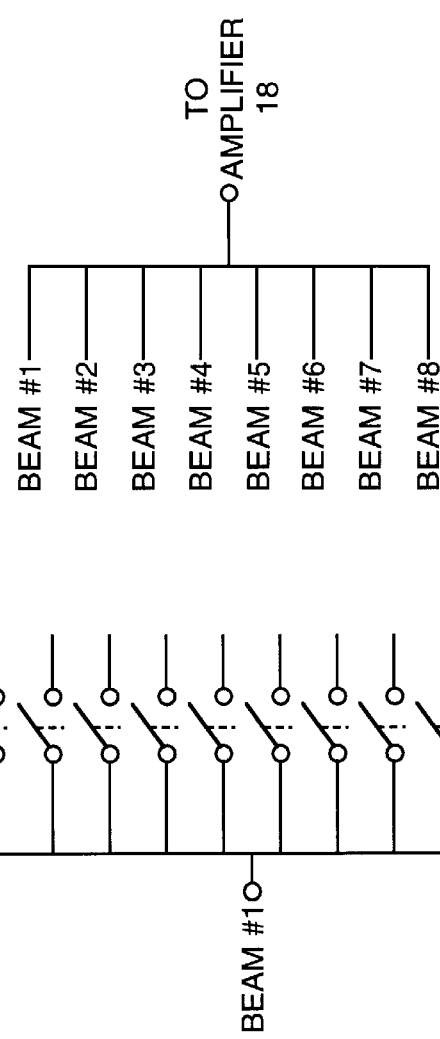
FIG. 3 illustrates a power combiner that may be used in the active switch matrix subsystem.

FIG. 3 illustrates an exemplary power combiner 17 that is used in the switch matrices 11a, 11b employed in the active switch matrix subsystem 10. The outputs from the PIN diodes 16 (FIG. 2) are connected via printed circuit paths (artwork) to a plurality of 8:1 power combiners 17 that are also formed as artwork on the substrate. Each of the inputs into the 8:1 power combiners 17 correspond to an input from each of the beams. There are fourteen 8:1 power combiner 17 that are required to complete the PIN diode redundancy scheme provided by the active switch matrix subsystem 10.

Figure 4:
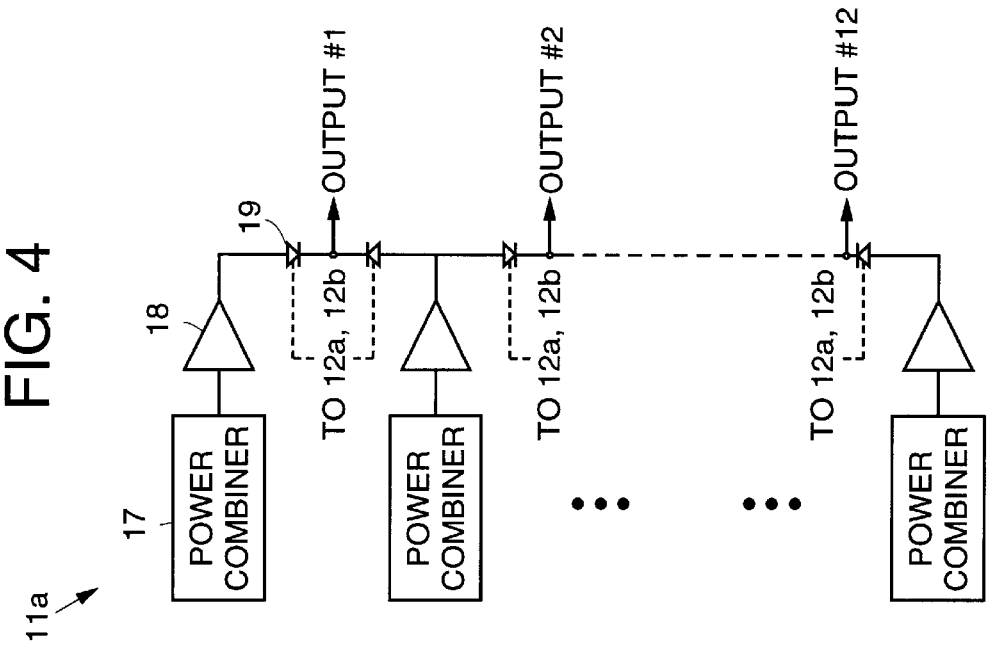
FIG. 4 illustrates an exemplary configuration of a power combiner/amplifier/PIN diode switch that may be used in the active switch matrix subsystem.

FIG. 4 illustrates interconnection of the power combiners 17, the amplifiers 18 and the output PIN diode switches 19 used in the active switch matrix subsystem 10. The output from each of the 8:1 power combiners 17 is coupled to one of the amplifiers 18. The amplifiers 18 may comprise an integrated circuit chip amplifier, such as are manufactured by Litton or Texas Instruments, for example. There are fourteen amplifiers 18 that are used to provide a 14-for-12 redundancy scheme provided by the active switch matrix subsystem 10 The outputs of the fourteen amplifiers 18 are connected to the output PIN diode switches 19 that are used to complete the 14-for-12 redundancy scheme for the amplifiers 18. The twelve outputs from the output PIN diode switches 19 correspond to the output of the active switch matrix subsystem 10.

Referring now to FIG. 5, it shows a detailed diagram illustrating the exemplary active switch matrix of FIG. 1. Each switch matrix 11a, 11b (one for each polarization) incorporates eight power dividers 15 that each use fourteen PIN diodes 16, fourteen power combiners 17, the plurality of amplifiers 18. There are eight inputs into each switch matrix 11a, 11b, one for each beam. Each input is divided by fourteen using one of the fourteen-way power dividers 15. Each power divider 15 is formed on a substrate, such as by forming printed circuit paths (artwork) on the substrate. The fourteen-way power divider 15 is used so that two additional switch paths are available to provide redundancy. Each of the outputs of the power divider 15 is connected to a PIN diode 16 which functions as a switch under control of the first or second controller 12a, 12b.

Reliability of the active switch matrix subsystem 10 will now be discussed. The RF portion of the active switch matrix subsystem 10 described above uses a very small number of components. However, redundancy is incorporated in the subsystem 10 to increase its probability of success and reduce the risk of failure of a complete beam. A very conservative failure rate of 25 FITs (failures per billion hours) was used for each of the beam switch paths. This path includes eight PIN diodes 16 to provide for beam selection, one power amplifier 18, and one output PIN diode 19 to provide for output redundancy selection. The probability of success for the RF portion of the active switch matrix subsystem 10 is greater than 0.9999 for a 13 year mission.

Each of the controllers 12a, 12b has a dedicated DC/DC converter 13a, 13b which provides DC power to the respective controllers 12a, 12b and the switch matrix assemblies 11a, 11b. In the unlikely event of a failure of either the primary DC/DC converter 13a or the primary controller 12a, the backup controller 12b and DC converter 13b can be switched on. One controller 12a, 12b is used to send commands to both switch matrices 11a, 11b. A conservative failure rate of 200 FITs was estimated for the DC/DC converter 13a and its associated controller 12a. The probability of success for this configuration is greater than 0.9995 for a 13 year mission.

The probability of success for the active switch matrix subsystem 10 is shown in Table 1 below. The high probability of success is due to the simplicity of the design, the low parts count, and the redundancy incorporated into the design.

TABLE 1

Switch Matrix Subsystem Reliability

| | Prob. of success (13 Years) |
| --- | --- |
| Switch Matrix (Horiz.) | 0.9999 |
| Switch Matrix (Vert.) | 0.9999 |
| Controller/DC | 0.9995 |
| Subsystem Total | 0.9995 |

Thus, an active switch matrix subsystem for routing communication channels through a satellite payload has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Switching apparatus comprising:
   first and second switch matrices that each comprise:
   (a) a plurality of power dividers that each comprise a plurality of controllable switches;
   (b) a plurality of power combiners coupled to corresponding outputs of each of the plurality of power dividers;
   (c) a plurality of amplifiers respectively coupled to outputs of the plurality of power combiners; and (d) a plurality of controllable output switches coupled to outputs of the plurality of amplifiers that are selectively enabled to provide outputs of the switching apparatus; and a first switch matrix controller coupled to the controllable switches and controllable output switches for selectively switching the switches to provide communication paths through the apparatus.

2. The switching apparatus of claim 1 further comprising:
a first DC/DC converter coupled to the first switch matrix controller for providing DC power to the first switch matrix controller and switch matrices.

3. The switching apparatus of claim 1 further comprising:
a second switch matrix controller coupled to the controllable switches and controllable output switches for selectively switching the switches to provide communication paths through the apparatus.

4. The switching apparatus of claim 3 further comprising:
a second DC/DC converter coupled to the second switch matrix controller for providing DC power to the second switch matrix controller and switch matrix assembly.

5. Switching apparatus comprising:
first and second switch matrices that respectively process a plurality of beams having first and second polarization states, and that each comprise:
(a) a plurality of power dividers for respectfully processing the plurality of beams that divides power derived from each of the beams;
(b) a plurality of controllable switches individually coupled to outputs of each of the power dividers;
(c) a plurality of power combiners that each comprise a plurality of inputs corresponding to the outputs of each of the power dividers and whose respective inputs are coupled to receive corresponding outputs of each of the plurality of power dividers;
(d) a plurality of amplifiers respectively coupled to outputs of the plurality of power combiners; and
(e) a plurality of controllable output switches coupled to outputs of the plurality of amplifiers that are selectively enabled to provide outputs of the switching apparatus;

a first switch matrix controller coupled to the plurality of controllable switches and to the controllable output switches for selectively routing the beams through the apparatus; and a first DC/DC converter coupled to the first switch matrix controller for providing DC power to the first switch matrix controller and switch matrices.

6. The switching apparatus of claim 5 further comprising
a second switch matrix controller coupled to the plurality of controllable switches and to the plurality of controllable output switches for selectively routing the beams through the subsystem; and a second DC/DC converter coupled to the second switch matrix controller for providing DC power to the second switch matrix controller and switch matrix assembly.

7. The switching apparatus recited in claim 5 wherein the switch matrix assemblies each comprise 8×12 switch matrix assemblies.

8. The switching apparatus recited in claim 5 wherein the plurality of power dividers comprise 1:14 power dividers.

9. The switching apparatus recited in claim 5 wherein the plurality of PIN diodes comprise fourteen 1:14 PIN diode switches.

10. The switching apparatus recited in claim 5 wherein the plurality of power combiners comprise fourteen power combiners.

11. The switching apparatus recited in claim 5 wherein the plurality of amplifiers comprise fourteen amplifiers.

12. The switching apparatus recited in claim 5 wherein the plurality of controllable output switches comprise twelve controllable output switches that provide for 14-for-12 redundancy at the output of the switching apparatus.

13. Switching apparatus comprising:
first and second switch matrices that respectively process a plurality of beams having first and second polarization states, and that each comprise:
(a) a plurality of power dividers for respectfully processing the plurality of beams that divides power derived from each of the beams;
(b) a plurality of controllable switches individually coupled to outputs of each of the power dividers;
(c) a plurality of power combiners that each comprise a plurality of inputs corresponding to the outputs of each of the power dividers and whose respective inputs are coupled to receive corresponding outputs of each of the plurality of power dividers;
(d) a plurality of amplifiers respectively coupled to outputs of the plurality of power combiners; and
(e) a plurality of controllable output switches coupled to outputs of the plurality of amplifiers that are selectively enabled to provide outputs of the switching apparatus;

a first switch matrix controller coupled to the plurality of controllable switches and to the plurality of controllable output switches for selectively routing the beams through the apparatus; and a first DC/DC converter coupled to the first switch matrix controller for providing DC power to the first switch matrix controller and switch matrix assembly;

a second switch matrix controller coupled to the plurality of controllable switches and to the plurality of controllable output switches for selectively routing the beams through the subsystem; and a second DC/DC converter coupled to the second switch matrix controller for providing DC power to the second switch matrix controller and switch matrices.

14. The switching apparatus recited in claim 13 wherein the switch matrix assemblies each comprise 8×12 switch matrix assemblies.

15. The switching apparatus recited in claim 13 wherein the plurality of power dividers comprise 1:14 power dividers.

16. The switching apparatus recited in claim 13 wherein the plurality of PIN diodes comprise fourteen 1:14 PIN diode switches.

17. The switching apparatus recited in claim 13 wherein the plurality of power combiners comprise fourteen power combiners.

18. The switching apparatus recited in claim 13 wherein the plurality of amplifiers comprise fourteen amplifiers.

19. The switching apparatus recited in claim 13 wherein the plurality of controllable output switches comprise twelve controllable output switches that provide for 14-for-12 redundancy at the output of the switching apparatus.

* * * * *